July 7, 1942.  E. CHALLET  2,288,967

ELECTRIC HEATING PLATE

Filed Sept. 9, 1940  2 Sheets-Sheet 1

July 7, 1942.　　　　E. CHALLET　　　2,288,967
ELECTRIC HEATING PLATE
Filed Sept. 9, 1940　　　2 Sheets-Sheet 2

Inventor:
E. Challet
By E. F. Wenderoth
Atty

UNITED STATES PATENT OFFICE 2,288,967

ELECTRIC HEATING PLATE

Etienne Challet, Bern, Switzerland, assignor of one-fourth to the firm Entreprises Electriques Fribourgeoises, Fribourg, Switzerland, a firm of Switzerland Application September 9, 1940, Serial No. 356,062
In Switzerland July 8, 1940

2 Claims. (Cl. 219—37)

The present invention due to Mr. Etienne Challet, Bern (Switzerland), relates to new and useful improvements in electric heating plates having a heating body which comprises three movable members disposed concentrically to each other and presenting each an annular crest, said members being automatically adjustable in relation to each other when a pan is placed upon them.

It is an object of the invention to replace the springs hitherto used to vary the relative positions of the movable members of the heating body by other improved means particularly adapted to simplify the construction of heating plates and to render the same more reliable in operation without affecting the thermoelectric efficiency of the plate.

Another object of the invention is to provide an electric heating plate of the above mentioned type which is so constructed as to permit liquids spread over the heating body to trickle towards the periphery of said body.

With the above and other objects in view which will appear as the description proceeds, the invention resides in the novel features hereinafter set forth, illustrated by way of example in the accompanying drawings and more particularly pointed out in the appended claims.

Referring to the drawings.

Figure 1:
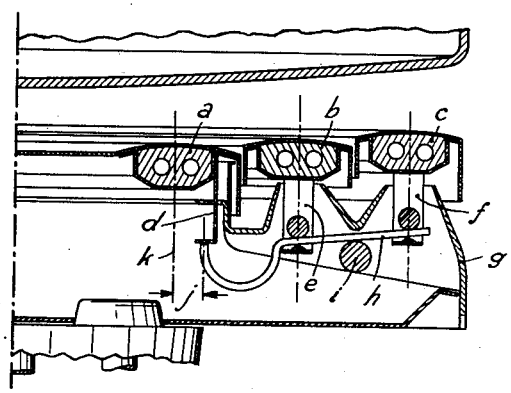
Figs. 1, 2 and 3 are vertical axial sectional views showing a first embodiment of the invention in different working positions.
Figure 2:
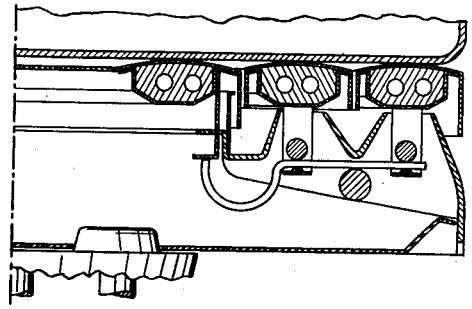
Figure 3:
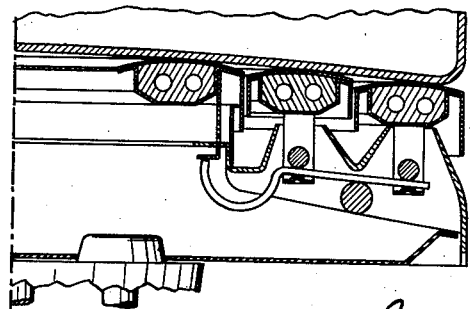

The electric heating plate according to the Figures 1, 2 and 3 comprises a frame or carcass $g$ having thereon a series of horizontal shafts $i$ which are formed integral with or otherwise secured to said carcass and arranged equidistant from the center thereof. It comprises also a heating body carried by said carcass and constructed of three separate movable rings $a$, $b$ and $c$ disposed concentrically to each other and presenting each an annular crest and claws $d$, $e$ and $f$, respectively, projecting from the rings towards the interior of the carcass. Said claws are shown bearing on radial equalizers $h$ equally distributed around the center of the carcass and heating body and being each pivotally supported intermediate its length on one of said shafts so as to afford an outer and inner rocking arm, the outer arms being adapted to support the claws $f$ of the outer ring $c$, and the inner arms being used as supports for the claws $e$ of the intermediate ring $b$ and the claws $d$ of the inner ring $a$ of said heating body. There are preferably provided three equalizers arranged at angular positions of 120° with respect to each other.

Moreover, as clearly shown in Fig. 1, the claws $e$ and $f$ of the outer rings $b$ and $c$, respectively, are supported by the equalizers on points which lie directly beneath the circular center line passing through the centers of the vertical cross sections of each of said outer rings. while the claws $d$ of the inner ring $a$ are supported on points beneath said ring which are outside the corresponding center line of said inner ring at a substantial distance $j$ from the vertical cylindrical surface $k$ containing said center line. It is to be seen, therefore, that the ideal stem traversing the summit of the curvature formed by the three rings $a$, $b$ and $c$ is not a straight line but has, as illustrated in Fig. 1 which shows the rings in unloaded position, the general conformation of a curved line which is similar to the line of intersection between a vertical plane and the spherical calotte formed by the bottom of the pan shown in Fig. 1.

Should the curvature of the bottom of the pan not be as deep as the curvature formed by the three rings of the heating body, the pan when placed upon said body comes to rest with its bottom on the outer ring $c$ which by the intermediary of the equalizers causes the other rings $b$ and $a$ to approach towards said bottom so as to bear thereagainst. Owing to the afore mentioned difference $j$ the inner ring $a$ will not raise as much as would be the case when the equalizers be acting upon the geometric axis passing through the center of the curvature. It will be seen, therefore, that the said inner ring raises only to an extent necessary to come into contact with the bottom of the pan.

Pans having a flat bottom as shown in Fig. 2 will contact in the same way with the different rings of the heating body.

Also when using pans having an inwardly bowed bottom as shown in Fig. 3 the equalizers will always act in such a way as to assure a good contact between the said bottom and the whole of the heating body. The thermoelectric efficiency of the heating plate is thus always kept at a high value whatever the form and curvature of the bottom of the pan.

Moreover, it is to be observed that a pan whose bottom has not the exact conformation of a spherical calotte will contact correctly with the heating body owing to the equalizers shown which are made of flexible metal with a view to permit correction of small differences in the curvature of the bottom of the pan.

Figure 4:
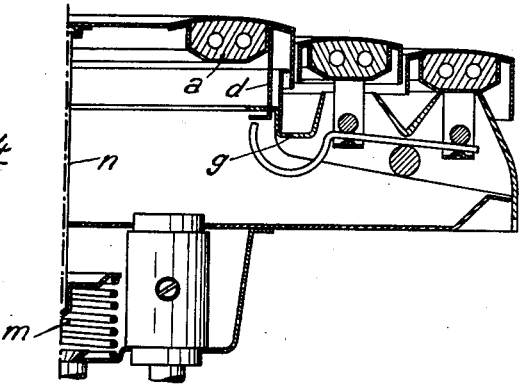
Fig. 4 is a like view showing a second embodiment of the invention.

Fig. 4 shows an electric heating plate according to the second embodiment which is of the same type provided, however, with a spring $m$ acting through a peg $n$ upon the inner ring $a$ of the heating body to urge said ring upwardly until the claws, one of which being shown at $d$ in said figure, abut against a border of the carcass $g$. A small clearance is provided between the left end of the equalizer shown and the underside of the claw $d$.

The heating plate provided with a spring operates in the following way: A pan having a more or less outwardly bowed bottom comes to rest on the inner ring $a$ which then acts upon the inner ends of the equalizers to cause the same to lower the middle ring while simultaneously raising the outer ring until the whole of the heating body will be seating correctly against the bottom of said pan.

As a particularly practical advantage of the heating plate as above described it is to be noted that the heating body assumes in its position of rest the form of a truncated cone permitting liquids spread thereover to trickle towards the periphery of said body. Moreover, it will be seen that in both the embodiments described the variation of the relative positions of the three rings is obtained by means of equalizers whereas hitherto only specially constructed springs were used for this purpose. The heating plate shown using equalizers instead of springs is essentially simple in its construction; it is more efficient in operation than former arrangements, and after long periods of use is not likely to become out of order or to occasion repair, substitution or adjustment.

Figure 5:
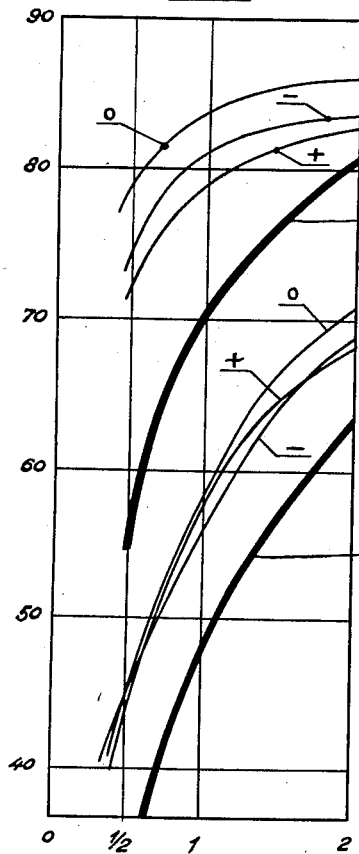
Figs. 5 and 6 are diagrams showing the efficiency of the two embodiments illustrated and described.
Figure 6:
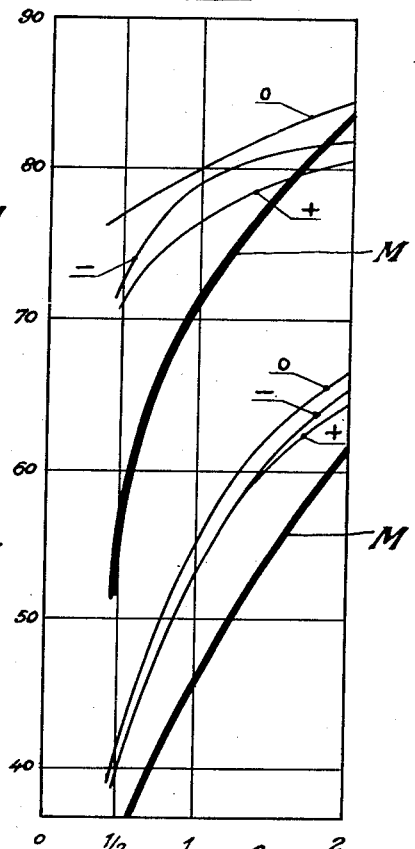

The Figures 5 and 6 show the efficiency diagrams of the electric heating plates according to the invention. The diagrams illustrate the result of a boiling process obtained with heating plates as above described. The axis of abscissas indicates in litres the quantity of water heated while the ordinates represent the resulting electrothermic efficiency.

On carrying out the experiments, ordinary electric heating plates of a best qualified type having a well dressed massive heating body of 1200 and 1800 watts, respectively, and a total weight of 1,680 and 1,855 kilogrammes, respectively, and carrying each a pan of 1,030 kilogrammes with a thick-walled bottom specially adapted for electric heating were compared with heating plates of 1200 and 1800 watts of the type shown in the figures of the drawing weighing each 0.955 and 0.965 kilogrammes, respectively, and utilising aluminium pans weighing 380 grammes and having a bottom which measured 1 to 1.2 millimeters in thickness. It was necessary for the experiments to slightly deform or bow the bottoms of the pans to a depth of 1% of the diameter of the bottom, that is ±1.8 millimeter.

Pure water was used for the tests and was brought from 20° to 95° Celsius starting the experiments at the cold state of the plates (bottom of the figures) or at the hot state (top of the figures). As hot state is to be understood the state of the plate after a five minutes time of boiling according to directions respecting this matter of the Swiss Association of Electrical Engineers (Association Suisse des Electriciens).

On each diagram shown in Figs. 5 and 6, M designates the efficiency of the ordinary massive plate and the corresponding pan in the normal working state. The diagrams designated by the signs +, 0 and − correspond to the efficiency of the heating plates according to the invention and utilizing pans with differently bowed bottoms, respectively, i. e. pans with an outwardly bowed or convex bottom (+), pans with a flat bottom (0) and pans with an inwardly bowed or concave bottom (−).

It will be seen from the said diagrams that the thermoelectric efficiency of the electric heating plates according to the invention is greatly increased in particular at starting the heating from the cold state.

From the foregoing, it is believed that the construction and advantages of the present invention may be readily understood by those skilled in the art without further description, it being borne in mind that numerous changes may be made in the details disclosed without departing from the spirit of the invention as set out in the following claims.

What is claimed and desired to be secured by Letters Patent is:

1. Electric heating plate comprising three annular concentric heating units, an inner one, an intermediate one, and an outer one, which have respectively mean radii approximately in the ratios of 3, 5 and 7, and which are supported on resilient radial equalizers pivoted at a point corresponding to a radius in the ratio of about 6 in respect with said previous ratios; the distances of the points of support of said units on said equalizers being respectively in the ratios of about 2.1 and minus 1 when measured from said equalizers' pivot.

2. Electric heating plate comprising three annular concentric heating units, an inner one, an intermediate one, and an outer one, which have respectively mean radii approximately in the ratios of 3, 5 and 7, and which are supported on resilient radial equalizers pivoted at a point corresponding to a radius in the ratio of about 6 in respect with said previous ratios; the distances of the points of support of said units on said equalizers being respectively in the ratios of about 2.1 and minus 1 when measured from said equalizers' pivot, the inner annular concentric heating unit being further provided with independent vertical resilient means.

ETIENNE CHALLET.